(No Model.)
J. J. QUINBY.
FRUIT JAR.
No. 305,218. Patented Sept. 16, 1884.
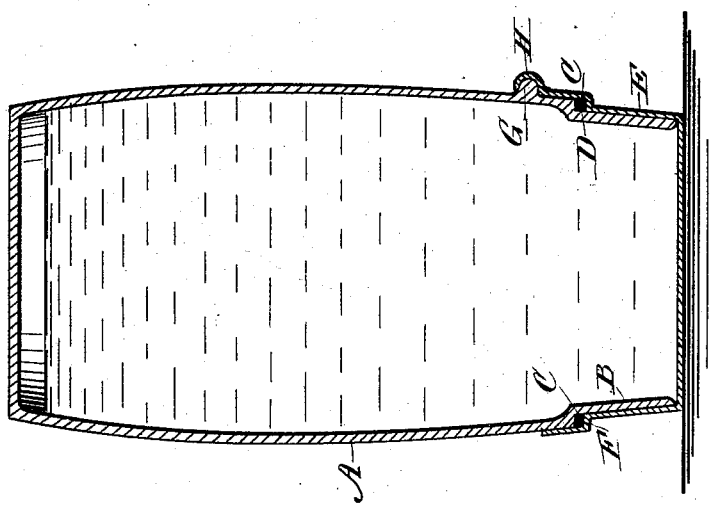
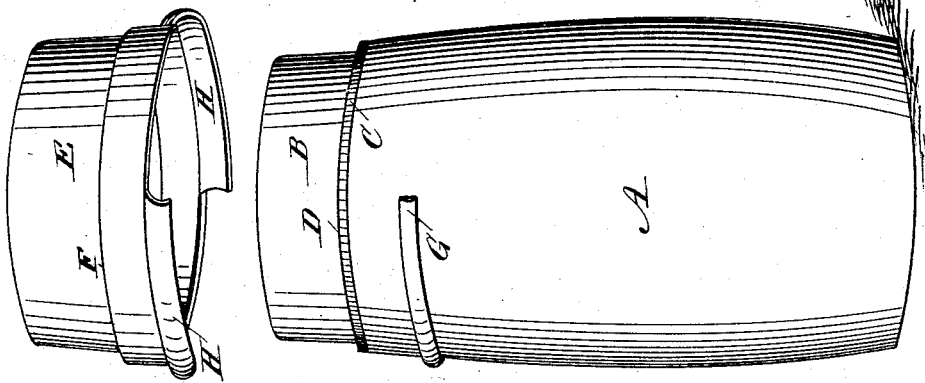
WITNESSES:
C. Neveux
C. Sedgwick
INVENTOR:
J. J. Quinby
BY Munn & Co
ATTORNEYS.

UNITED STATES PATENT OFFICE.

JOHN J. QUINBY, OF ARMONK, NEW YORK.

FRUIT-JAR.

SPECIFICATION forming part of Letters Patent No. 305,218, dated September 16, 1884.

Application filed February 9, 1884. (No model.)

*To all whom it may concern:*

Be it known that I, JOHN J. QUINBY, of Armonk, in the county of Westchester and State of New York, have invented a new and Improved Fruit-Jar, of which the following is a full, clear, and exact description.

The object of my invention is to provide a new and improved fruit-jar which is simple in construction, closes very tightly, and is adapted to be kept inverted, so as to make it impossible for air to pass into the jar.

The invention consists in a jar provided with a long neck, a shoulder at the bottom of the neck, and two diametrically-opposite quadrant ridges a short distance below the shoulders, combined with a cover having a shoulder and two diametrically-opposite grooved quadrant flanges, which pass over the ridges on the jar and hold the cover on the jar.

Reference is to be had to the accompanying drawings, forming part of this specification, in which similar letters of reference indicate corresponding parts in both the figures.

Figure 1 is a perspective view of my improved fruit-jar and its cover, the latter being removed from the jar. Fig. 2 is a longitudinal sectional view of the same, showing the cover on the jar and the jar inverted.

The jar A is provided at its top with a long slightly-tapering neck, B, at the base of which an annular shoulder, C, is formed in the outer surface of the jar, on which shoulder a suitable packing-ring, D, is placed.

The cover E is made to fit closely on the neck B, and is provided near its lower edge with a shoulder, F, to fit closely on the rubber packing-ring D. The cover is made of such height that when its shoulder rests upon the ring D the bottom surface of the head of the cover will rest on the upper edge of the neck B.

A short distance below the shoulder C two diametrically-opposite horizontal quadrant ridges, G, are formed, and on the lower edge of the cover or cap E two diametrically-opposite grooved quadrant flanges, H, are formed, which fit closely on the ridges G.

To secure the cover on the jar, it is placed on the jar, and is then turned on the longitudinal axis of the jar to cause the grooved flanges H to pass over the ridges G, thus holding the cover or cap firmly on the jar. As the long neck B is in contact with the corresponding part of the cover, it is very difficult or almost impossible for air to pass between the cover and neck into the jar. The packing-ring D also prevents air from entering. If the can is inverted, the contents of the jar assists in sealing it and prevents air from passing into the jar, thus making it impossible for the contents to be spoiled by coming in contact with the air. Even if the rubber packing is left off, the contents of the jar cannot flow out, on account of the pressure of the outer air.

The above-described jar and its cover can be made of glass, earthenware, metal, &c., in any desired suitable size, and can be used for preserves, jellies, milk, oil, or other liquids.

Having thus described my invention, I claim as new and desire to secure by Letters Patent—

1. The combination, with a jar provided with a long neck, having a shoulder at the base of the said neck, of a packing fitting on said shoulder, and a cover or cap fitting on the neck, and provided with a shoulder near its lower edge, which lower edge extends below the shoulder on the jar and engages with the jar, substantially as herein shown and described.

2. The combination, with a jar having a long neck, at the base of which a shoulder is formed, and two horizontal diametrically-opposite quadrant ridges on the outer surface a short distance below the shoulder, of a cap or cover fitting closely on the neck, and provided at its lower edge with two diametrically-opposite grooved quadrant flanges, and with a shoulder a short distance from the lower edge, substantially as herein shown and described.

3. The combination, with a fruit-jar, A, having a neck, B, a shoulder, C, and two opposite horizontal quadrant ridges, G, of the cap or cover E, having a shoulder, F, and the grooved flanges H, and of the packing-ring D, substantially as herein shown and described.

JOHN J. QUINBY.

Witnesses:
M. W. FISH,
GEO. M. JENKINS.